(12) United States Patent
Bhaskar et al.

(10) Patent No.: US 6,432,463 B1
(45) Date of Patent: Aug. 13, 2002

(54) PROCESS FOR PRODUCING EXPANDABLE PELLETS

(75) Inventors: Ajay Rajeshwar Bhaskar, Plano; Kevin Charles Cogan, Oak Point; Bilal Moussa Kaafarani; V.N. Mohan Rao, both of Plano, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/999,009

(22) Filed: Oct. 31, 2001

(51) Int. Cl.[7] ................................................. A21D 8/00
(52) U.S. Cl. ........................ 426/496; 426/503; 426/516
(58) Field of Search ................................. 426/496, 502, 426/503, 516, 473; 425/464

(56) References Cited

U.S. PATENT DOCUMENTS

| | | |
|---|---|---|
| 3,348,950 A | 10/1967 | Weiss |
| 3,600,193 A | 8/1971 | Glabe |
| 3,892,511 A * | 7/1975 | Farrant et al. ............... 425/464 |
| 3,922,370 A | 11/1975 | Prakash |
| 4,137,161 A | 1/1979 | Shimada |
| 4,418,088 A | 11/1983 | Cantenot |
| 4,567,051 A * | 1/1986 | Baker et al. ................. 426/516 |
| 4,645,679 A | 2/1987 | Lee |
| 4,763,569 A | 8/1988 | Wenger |
| 5,429,835 A | 7/1995 | Wenger |
| 5,652,010 A | 7/1997 | Gimmler |
| 5,932,264 A | 8/1999 | Hurd |
| 6,168,817 B1 | 1/2001 | Pavan |
| 6,224,933 B1 | 1/2001 | Bhaskar et al. |
| 6,242,034 B1 | 6/2001 | Bhaskar et al. |

FOREIGN PATENT DOCUMENTS

| | | |
|---|---|---|
| CA | 2082602 | 8/1991 |
| DE | 4137161 A1 | 5/1993 |
| GB | 1147758 | 4/1969 |

OTHER PUBLICATIONS

Hoseney, R.C. 1996. Principles of Cereal Science and Technology. 2nd Edition, American Association of Cereal Chemists, Inc., St. Paul. Minnesota, USA.

Fast, R.B. and Caldwell, E.R. 1990. Breakfast Cerals and How They Are Made. American Association of Cereal Chemists, Inc., St. Paul, Minnesota, USA.

\* cited by examiner

*Primary Examiner*—George C. Yeung
(74) *Attorney, Agent, or Firm*—Colin P. Cahoon; Carstens, Yee & Cahoon, L.L.P.

(57) ABSTRACT

With the process for producing potato based expandable pellets, an intermediary product is manufactured that is capable of being stored for up to about six months. These pellets can be later expanded into a food product, particularly a potato based snack product that has improved flavor qualities and increased oil pick up. To form the pellets, a potato meal is passed through a twin screw extruder at a relatively low extruder rotational speed, which increases the residence time and the volume of bed pack in the extruder while decreasing shear. The extrudate produced is then split into ribbons that are subsequently perforated. These ribbons are then formed into shaped pellets.

21 Claims, 1 Drawing Sheet

PROCESS FOR PRODUCING EXPANDABLE PELLETS

BACKGROUND OF THE INVENTION

1. Technical Field

The present invention relates to a process for producing expandable potato-based pellets and, in particular, to a process for producing expandable potato-based pellets using a twin screw extruder. The process produces shelf stable products that can be later processed into finished snack chips.

2. Description of Related Art

The process for producing pellets as generally adapted in the food industry involves a very minimal cook of starch and forming a shape, such as a particular pasta shape, wherein the product is later cooked in the presence of excess water. The cooked mass is sheeted, cut, and dried for later frying.

Known processes for producing potato-based pellets do not provide for making a finished product having a shaped surface beyond a simple curve or wave. Further, known processes utilizing twin screw extruders do not provide for a potato-based pellet product wherein embossing helps increase products surface area whereby a finished product has improved oil gain and increased flavor impact.

Typical pellet or half-products require two steps to produce a finished snack product. In a first step, the ingredients, which generally include cereal products and starches, are hydrated to form an extrudable mixture. During extrusion, the ingredients are partially gelatinized creating dough, which is passed through a die. The dense sheeted material, which contains from about 20 to about 40% moisture by weight, is then cut into pellets (with or without lamination) and processed through a dryer to arrive at a final moisture of about 10 to about 14%. This product can then be stored and later processed after moisture equilibration. The potato-based product produced utilizing a single screw extruder will not have a desirable texture, a significant expansion upon cooking, and significant storability. Further, single screw extruder processes are operated at temperatures sufficiently low that allow microbial growth. This requires frequent equipment stoppage to allow for cleaning.

Accordingly, a need exists for a process for making a potato based pellet that has significant storability, improved shape, texture, and flavor while being easily manufactured.

SUMMARY OF THE INVENTION

The invention comprises a process for continuously producing a potato based expandable pellets. The potato base comprises potato flakes, which include potato granules to provide enhanced potato flavor, and starch, which generally includes potato, modified potato, and corn starch. Additionally, salt and emulsifier are added to the potato base thereby forming a potato flour mixture. The potato mixture is then passed through a preconditioner for mixing, hydration, and partial thermal cooking.

After being hydrated, the potato mixture becomes a free flowing dough and is routed through a twin screw extruder. The extruder first mechanically shears and cooks and then cools the meal before passing it through a die to form a thin wide ribbon. The ribbon is split into two individual ribbons for treatment. The treatment involves perforating and stretching each ribbon prior to laminating the ribbons together. The ribbons are then cut into pellets with the perforated surfaces forming the exterior of the pellets.

Once the pellets are formed, they are transferred to a series of dryers. The first dryer is a shaker dryer that prevents formation of clusters during the initial drying phase. This is followed by passing the pellets through a short dryer where pellet moisture is reduced without hardening the surface. To reduce the pellet moisture further, a finishing dryer dries and tempers the pellets. The dried pellets are then ready for packaging for later production by, for example, flying, air puffing, or microwave cooking.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
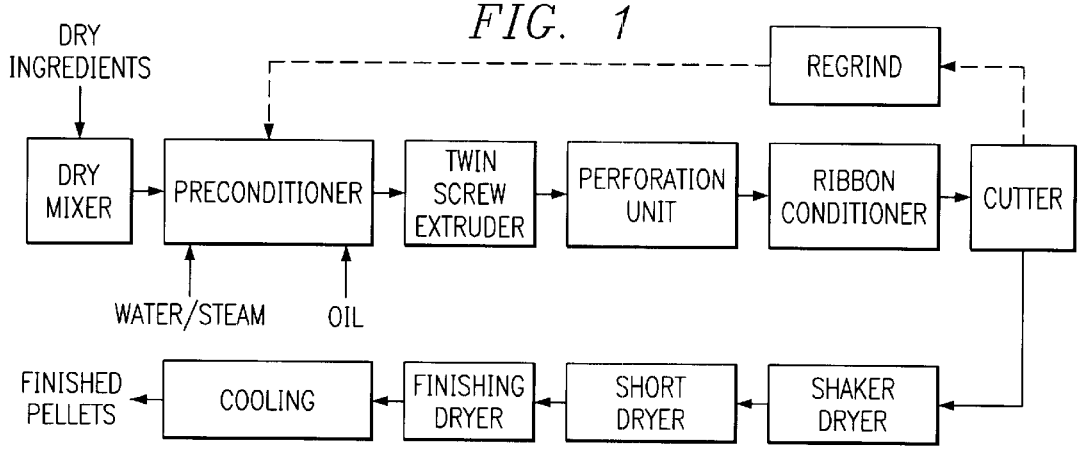
FIG. 1 is a block diagram illustrating a preferred embodiment of a process for the present invention.

Applicants' invention is an expanded pellet process that generates half-products (pellets) that are shelf stable and can be finished or otherwise rethermalized at a later time (up to 6 months). FIG. 1 shows a schematic block diagram illustrating an exemplary process for making expanded pellets from a potato base. The primary raw material of the pellets is potato flakes including potato granules to provide enhanced potato flavor. The potato flakes and granules are then mixed with potato starch, corn starch, and/or other food starch along with an emulsifier and, salt in a dry mixer. This mixture is fed to a preconditioner for mixing and hydrating with water and steam. Further, the preconditioner also partially gelatinizes the mixture prior to extrusion. Oil is optionally added to the preconditioner for controlling expansion and for product release at cutting.

During extrusion, the mixture is mechanically sheared and cooked within an extruder. The mixture is then cooled prior to being passed through a die. Upon passing through the die, the extrudate forms a thin wide ribbon that is split into two individual ribbons. The two individual ribbons are perforated and then cooled in a ribbon conditioner prior to being laminated and cut into pellets. When cut into shaped pellets, the residue material from the ribbon can be recycled to a regrinder for refeeding to the preconditioner. The shaped pellets are fed into one or more dryers, including a shaker, short, and finishing dryer for drying the pellets to a moisture level for packaging. After drying, the pellets are cooled and then passed along for packing and/or processing into a snack product.

An exemplary process as shown in FIG. 1 starts with weighing step wherein the respective ingredients are mixed. In operation, the major ingredients are first weighed, which include the potato flakes at about 25% to about 40% and potato granules about 10% to about 30% along with the potato starch at about 30% to about 50% and corn starch at about 5% to about 15%. Typically, corn starch is maintained to an amount less than about 15% to avoid hindering expansion and hardening of the product's texture. Highly cross linked starch, which is added at preferably about 5%, may include a modified potato starch for enhanced properties such as crispier texture. Thereafter, the minor ingredients are weighed and added to the main ingredients. The minor ingredients can include, for example, emulsifier (such as mono/diglycerides) at about 0.3%, salt at about 1.5%, and oil at about 1% to about 3%. The flour mixture is then mixed to assure sufficient blending of the ingredients, which for example can occur after about 15 minutes.

The mixture of ingredients is volumetrically fed to a preconditioner which is a single shafted paddle mixer for example. In the preconditioner, moisture is added to the dry mixture in the form of liquid water and steam to hydrate and partially gelatinize the mixture. Typically, a flour mixture enters the preconditioner at a wet basis moisture of about 12% and exits as a meal (hydrated flour mixture) at about 30% to about 40%. In a preferred embodiment, the meal's mean residence time in the preconditioner is about 90 seconds. The ratio of steam to water is adjusted depending on the gelatinization level of the entering mixture (determined by Rapid Visco-Analyzer, "RVA") and the degree of expansion later observed in expanded pellets. The total combined weight of the water and steam is maintained in order to achieve a consistent moisture level of the meal as it exits the preconditioner. The water that is added is preheated typically to about 65° C. to about 71° C. to maintain an exit temperature of the mixture at about 60° C. to about 90° C., more preferably about 71° C. which is adequate to inhibit microbial growth within the preconditioner. The amount of steam can be adjusted to control the exit temperature of the meal from the preconditioner. A hot water jacket around the preconditioner can additionally be used to moderate and control the temperature level of the mixture. Oil, such as partially hydrogenated cotton and/or soy oil, is added to the preconditioner to aid with handling of the product after extrusion.

After being preconditioned, the meal is fed to a twin screw extruder. The extruder, in one preferred embodiments, is a Mapimpianti twin screw model tt92/28D having a L/D ratio of 28, a shaft for of 89 mm, and consists of seven barrel zones. The meal and additional water are fed into the first zone. For example, the extruder can be set to a screw RPM of 165 and preferably between 160 RPM to 220 RPM to optimize the mechanical input to the meal. Barrel zones two through five are heated to help achieve the desired level of cook by mechanical and thermal processes which is generally between about 50° C. to about 80° C. Barrel zones six and seven are cooled to minimize extrudate die temperature and to help reduce steam flashing at the die. Otherwise, steam flashing produces undesirable bubbles in the resulting extrudate ribbon as the temperature of the extrudate reaches about 101° C. to about 102° C. and is exposed to atmospheric pressure. The extruder has a lateral and central head temperature of about 90° C. and a head pressure of about 100 bar. Further, a vacuum vent is attached to zone five to provide evaporative cooling of the extrudate. A typical vacuum level is achieved at about 50 mm of mercury with an evaporative rate of about 15 kilograms to 30 kilograms of water per hour.

Another quality control feature of the invention is the variation of water added to the extruder. Since the flour mixture has been hydrated in the preconditioner and excess water can be removed by vacuum, the addition of water acts as a lubricant to the flour mixture, reducing its viscosity and, thereby, reducing the residence time of the flour mixture in the extruder. This reduces the torque required to transfer the less viscous product through the extruder. Consequently, the addition of water to the extruder reduces the cook level.

To obtain a maximum residence time and minimal shear that is required for optimum product flavor and texture, the RPM of the extruder is reduced. As the rotation speed decreases, the residence time of the flour meal increases. The lower the extruder RPM is the more bed packing and longer residence time in the extruder, and uniformity in time of the flow out of the die occurs. It is believed that the degree of cook of the extrudate is slightly higher at a lower RPM than at a higher RPM. In one embodiment, a typical operating range for the extruder is between about 160 RPM to about 220 RPM with an extrudate temperature of about 88° C. to about 101° C.

The minimally sheared extrudate is then fed through a single die with adjustable choker bars and die lips. Non-uniformity across the width of the extrudate ribbon is minimized with fine-tuning of the orifice between the die lips. The nominal ribbon thickness is about 1.00 mm to 1.35 mm and is measured by an online thickness gauge before entering the embosser.

The ribbon at the die face is very pliable, but quickly stiffens into a sheet that can be mechanically manipulated without significant deformation to the ribbon and yet remain somewhat flexible. The ribbon is slit by a small stationery blade into two ribbons of equal width at the die exit. The two ribbons are then transferred to a perforation unit. The perforation unit has four pairs of rollers. The first two pairs of rollers have a perforation pattern that pinches the hot ribbon. The second two pairs of rollers stretch the pinched ribbon to make holes in the ribbon. The two parallel perforated ribbons are thereafter transferred into a seven pass belted cooler by a transfer conveyor belt for ribbon conditioning. The cooler is kept at about 30° C. to about 60° C., preferably 35° C., wherein cold air is applied to both sides of the ribbons. Further, the air temperature in the tunnel is manipulated to achieve a ribbon temperature of about 35° C. to about 40° C. at the embosser. The cooling of the ribbons helps prevent them from wrapping on the embosser rollers or cutter.

After the ribbon exits the cooling tunnel, conveying rollers deliver the ribbons to separate embosser and anvil roller pairs. Alignment of the ribbons into the embosser/cutter unit operation is accomplished by manually adjusting the panning conveyors. The embosser rollers additionally serve to hold the ribbon to prevent it from swaying. Each sheet of ribbon is then lightly embossed.

Following embossing, the ribbons are brought together between the nip of the cutter and anvil having the embossed surfaces of the ribbons form the exterior surfaces of the pellets. After embossing, the joined ribbon is cut into pellets. The cutter is a rotary die that serves two functions: cutting and laminating the pellets. The radius of the cutter flutes laminates the outside edges of the shape while the land area crush cuts the pellets from the ribbons. The shape of the pellets include, for example, triangle, square, and hexagon.

In cutting, the entire width of the laminated ribbon is not cut into pellets. The portion of the ribbon that is not formed into pellets is referred to as edge lace. The trimmed edge lace is chopped and then ground into pieces referred to as "regrind," which are pieces that are approximately about 0.125×0.125×0.080 inches in size. Regrind is recycled back into the process at the inlet of the preconditioner at a rate of about 3% to about 10% by weight of the total meal feed rate. After cutting, the pellets are ejected and conveyed toward a shaker dryer.

Figure 2:
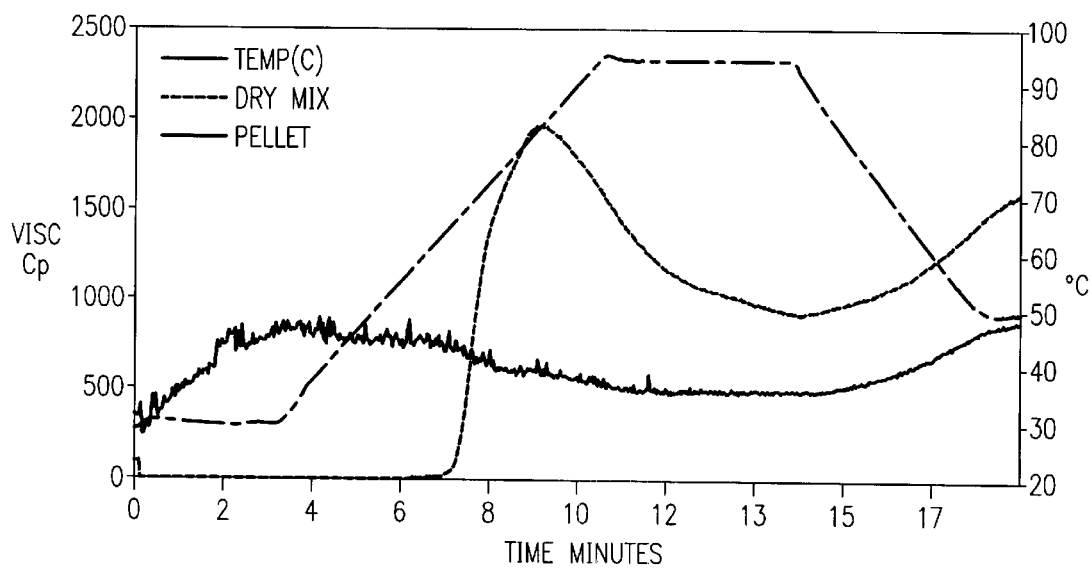
FIG. 2 is shows RVA profiles of an uncooked potato floor mixture dry mix and of pellets made from the same.

FIG. 2 shows an RVA profile of the pellets and potato flour mixture (prior to preconditioning) for describing the Theological property of the flour mixture before and after processing into a pellet made in accordance with the present invention. An RVA profile is generated by a Rapid Visco-Analyzer, which is a method well-known in the food industry for investigating hydration and gelling behavior of starches by characterizing the viscosity of a given sample. The method typically involves controlled heating and cooling as shown by temperature profile 110 of flour or starch suspensions in water at concentrations of 5% to 40% w/w. A solid concentration of about 12% w/w is used for all of the RVA profiles shown in FIG. 2. The X-axis of FIG. 2 shows the method time in minutes, and the Y-axis shows the tested viscosity in centipoise.

FIG. 2 shows a comparison of RVA profile 120 for an uncooked potato flour mixture made in accordance with the invention and an RVA profile 130 for pellets made from the same flour mixture after processing in accordance with the invention. RVA profile 120 exhibits a rapid increase in viscosity due to the cooking of the starch granules in the flour mixture. RVA profile 130 does not experience any drastic changes in viscosity as shown because the starch granules have already been cooked. These profiles are shown to illustrate the viscosity characteristics of the product made in accordance with invention. These RVA profiles are not intended to limit the invention to products that exhibit identical RVA profiles at the various stages shown.

The pellets are pneumatically transferred from the cutter discharge to a belted shaker dryer. The moisture level of the pellets entering this dryer is at about 24% and is reduced to about 20% to about 22% upon exiting. The shaker dryer temperature set point is about 55° C. The shaker dryer dries the surface of the pellets thereby preventing compaction and deformation when the pellets are treated in the finishing dryer.

From the shaker dryer, the pellets are pneumatically transferred first to a short dryer and then to a finishing dryer. Prior to the short dryer, the pellets are spread onto the belt with an oscillating spreader. The belted short dryer is set at about 50° C. and about 9% RH (relative humidity). The short dryer reduces the moisture content of the pellets from about 20% to about 22% down to a moisture content of about 17% to about 19%. The pellets are pneumatically transferred from the short dryer to a five pass belted finishing dryer. The finishing dryer consists of two stages. Stage one is a drying zone and is set at about 45° C. with about 18% RH. Stage two is a tempering zone that equilibrates the moisture gradients within the pellets. Stage two is set at about 40° C. with about 30% RH. The final dryer reduces the moisture content of the pellets from about 19% down to a moisture content of about 12%. Optionally, an ambient cooler conveyor is provided at the end of stage two to cool the pellets to room temperature before exiting the dryer. Thereafter, the pellets are immediately processed or are continuously fed into boxes or sacks for packing. If packed, these pellets can then be shipped to another location for further processing to form a snack product.

Pellets are submerged the entire time they are fried ensuring uniform frying of both pellet surfaces. To expand the pellets to a desired degree, the fryer temperature is manipulated. Bulk density is measured on-line after the fryer prior to seasoning.

The fried base is oil sprayed and seasoned in a rotating drum typical of corn chip processing. The expanded and seasoned product is then packaged by, for example, a vertical form and fill machine.

Pellets manufactured in accordance with the above-described features are capable of being stored for up to about six months. These pellets upon being cooked expand into a food product, particularly a potato based snack product, that has improved flavor qualities and increased oil pick up.

While the invention has been particularly shown and described with reference to a preferred embodiment, it will be understood by those skilled in the art that various changes in form and detail may be made therein without departing from the spirit and scope of the invention.

What is claimed is:

1. A process for making expandable potato-based pellets comprising the steps of:
    (a) passing a potato meal through a preconditioner wherein steam, water, and oil are added to the meal;
    (b) producing an extrudate by passing the meal through a twin screw extruder;
    (c) splitting the extrudate into at least two separate ribbons of extrudate;
    (d) perforating the ribbons with a perforation unit; and
    (e) forming shaped pellets from the perforated ribbons.

2. The process of claim 1 wherein the potato meal comprises potato flakes, potato granules, starch, salt, and emulsifier.

3. The process of claim 2 wherein the starch is comprised of potato starch, modified potato starch, corn starch, or mixtures thereof.

4. The process of claim 3 wherein the amount of corn starch in the meal comprises less than about 15% by weight.

5. The process of claim 1 wherein the water added to the meal comprises liquid water, steam, or a combination thereof, and is added to the preconditioner to hydrate and partially gelatinize the meal.

6. The process of claim 5 wherein the hydrated meal exits the preconditioner with a moisture wet basis of about 32% to about 36% and a temperature of 60° C. to about 85° C.

7. The process of claim 1 wherein the extruder is operated to maximize the meal's residence time in the extruder while minimizing shearing to obtain an extrudate with a temperature between about 88° C. to about 101° C. and an RVA viscosity of about 600 centipoise to about 1000 centipoise.

8. The process of claim 1 wherein extrudate exits a die on the extruder and is split into the two separate ribbons by a blade.

9. The process of claim 1 wherein the two ribbons are treated by the perforation unit by first applying a perforated pattern to each ribbon and then stretching each perforated ribbon to make holes.

10. The process of claim 9 wherein the perforation and stretching are performed by sets of rollers.

11. The process of claim 1 wherein forming the shaped pellets further comprises the steps of:
    (f) cooling the perforated ribbons;
    (g) embossing one side of each ribbon;
    (h) cutting the ribbons into pellets by joining the ribbons together wherein the embossed pattern on each ribbon forms an exterior surface of the pellets; and
    (i) drying the pellets.

12. The process of claim 11 wherein the embossing is performed by an embosser roller and anvil roller pairing.

13. The process of claim 11 wherein the cutting is achieved with a rotary die which laminates and cuts the pellets.

14. The process of claim 11 wherein residual extrudate remaining from the forming is reground and recycled to the inlet of the preconditioner.

15. The process of claim 11 wherein the drying further comprises passing the pellets through three drying stages which include a shaker dryer, a short dryer, and a finishing dryer.

16. The process of claim 11 wherein the dried pellets are at a moisture wet basis of about 12%.

17. The process of claim 1 wherein the formed shaped pellets can be stored for up to about six months before being expanded into a finished food product.

18. The process of claim 1 wherein the shaped pellets are shaped as triangles, squares, or hexagons.

19. The process of claim 1 wherein the thickness of the ribbon extrudate is about 1.00 mm to about 1.35 mm.

20. A process for making expandable potato-based pellets comprising the steps of:

(a) passing a potato meal through a preconditioner wherein water, steam and oil are added to the meal;

(b) producing an extrudate by passing the meal through a twin screw extruder;

(c) splitting the extrudate into at least two separate ribbons of extrudate;

(d) perforating the ribbons with a perforation unit;

(e) cooling the perforated ribbons;

(f) embossing one side of each ribbon;

(g) cutting the ribbons into pellets by joining the ribbons together wherein the embossed pattern on each ribbon forms an exterior surface of the pellets; and (h) drying the pellets.

21. Pellets made by the process of claim 1.

* * * * *